United States Patent [19]
Jung et al.

[11] Patent Number: 5,641,833
[45] Date of Patent: Jun. 24, 1997

[54] POLYOLEFINIC BLEND AND PROCESS FOR PREPARING THE SAME

[75] Inventors: Kwang Sik Jung, Incheon; Moon Seok Lee, Seoul; Yong Ho Kwon; Seong Jo Kim, both of Incheon, all of Rep. of Korea

[73] Assignee: Yukong Ltd., Seoul, Rep. of Korea

[21] Appl. No.: 371,245

[22] Filed: Jan. 11, 1995

[30] Foreign Application Priority Data

Jan. 11, 1994 [KR] Rep. of Korea .......................... 94-364

[51] Int. Cl.$^6$ ..................... C08L 23/02; C08L 33/20; C08L 67/02; C08L 77/00
[52] U.S. Cl. ..................... 525/57; 525/64; 525/66; 525/71; 525/74; 525/78; 525/84
[58] Field of Search ..................... 525/57, 64, 66, 525/71, 74, 78, 84

[56] References Cited

U.S. PATENT DOCUMENTS 5,369,168  11/1994  Famili ........................ 525/57

*Primary Examiner*—Patricia A. Short
*Attorney, Agent, or Firm*—Seidel, Gonda, Lavorgna & Monaco, P.C.

[57] ABSTRACT

A homogeneous polyolefinic blend and a preparation process thereof, are provided wherein the blend comprises polyolefin and a polymer which has a barrier property to organic liquid and vapor permeability. The barrier property is improved through the inclusion of mixed compatibilizing substances comprising an alkylcarboxyl-substituted polymer and reactive low molecular weight compounds. The compatibilizing substances are included by the means of ordinary processing equipment. The polymer with the barrier property having low organic liquid and vapor permeability is distributed as a multitude of thin, wide, disc-like layers in a polyolefin phase. The compatibilizing substances minimize the interfacial energy between the two polymers to adhere them together.

5 Claims, 4 Drawing Sheets

POLYOLEFINIC BLEND AND PROCESS FOR PREPARING THE SAME

BACKGROUND OF THE INVENTION

1. Field of the Invention

The present invention relates, in general, to a polyolefinic blend and process for preparing the same, and more particularly, to a homogeneous polyolefinic blend with a barrier property having low organic liquid and vapor permeability, as well as to an easy process for preparing the homogeneous polyolefinic blend with ordinary processing equipment.

2. Description of Prior Art

There are many patents that aim at improving barrier properties to fluid, for example, the barrier properties of blends of polyolefin and other polymers to organic liquid and vapor.

U.S. Pat. No. 4,410,482 discloses a process for preparing a heterogeneous blend of polyolefin and polyamide by low shear mixing. In this patent, the polyamide is present in the article as a multitude of thin, substantially two-dimensional, parallel and overlapping layers of material (as shown in FIG. 1A). An alkylcarboxyl-substituted polyolefin is used as a compatibilizer which is present between the layers and adheres them together. It is necessary to use low shear mixing when processing the heterogeneous blend. Therefore, it is difficult for the heterogenous blend to be manufactured into an article using ordinary high shear mixing processing equipment. Such a heterogeneous blend will not ordinarily have wide application to commercial processing equipment, unless the equipment is redesigned or modified.

European Patent Laid-Open Patent No. 0 238 197 suggests a preparation process for a homogeneous blend by high shear mixing which is capable of manufacturing an article having an improved barrier property to organic liquid and vapor permeability using ordinary processing equipment. The aim is to overcome the difficulty attributable to the low shear mixing processing conditions in preparing the above-stated heterogeneous blend.

Polymer blends with barrier properties having low organic liquid and vapor permeability are obtained by blending an organic liquid and vapor-permeable polymer with an organic liquid and vapor barrier polymer to form a discrete dispersion of the polymers in each other. This causes the organic liquid and vapor permeable polymer to undergo branching or a limited amount of cross-linking with an increase of viscosity sufficient to cause the polymers to separate into distinct phases composed of larger particles. This results in a homogeneous blend which has an improved barrier property to organic liquid and vapor.

A significant disadvantage of this European patent is that the organic liquid and vapor-permeable polymer should be partially cross-linked in a substantial amount (as much as the added amount of the coupling agent, 0.01 to 1% by weight) to obtain the homogeneous blend. The processability of the resulting blend is inevitably degraded when it is manufactured into a blown film. The resulting blown film also shows inferior mechanical properties. As shown in FIG. 1B, the morphology of the homogeneous blend is disc-like.

Korean Pat. Appln. No. 91-13347 "Polyolefinic blend comprising reactive low molecular weight compound and preparation process thereof" is a prior invention by the present applicant, which describes a heterogeneous blend similar in content to the present invention. This heterogeneous blend does not exhibit appropriate processability when it is manufactured into a film in ordinary processing equipment, and the resulting articles do not have the desired mechanical properties. Such disadvantages are overcome in the present invention, which is completely different from the prior invention by employing a polymeric compatiblizer which was not used in the prior invention.

The expression "heterogeneous blend" as used in this specification means that the organic liquid and vapor permeable polymer form a distinct phase. As shown in FIG. 5, polyolefin and a polymer with a barrier property having low organic liquid and vapor permeability have distinct phases. On the other hand, the expression "homogeneous blend" denotes that the polymer with barrier property having low organic liquid and vapor permeability is uniformly distributed in, for example, the polyolefin phase. This is shown in FIG. 2.

SUMMARY OF THE INVENTION

Therefore, it is the object of the present invention to provide a homogeneous polyolefinic blend with a barrier property having low organic liquid and vapor permeability.

It is another object of the present invention to provide a process for preparing a homogeneous polyolefinic blend, which is easily made in an ordinary extruder.

An aspect of the above objects of the present invention could be accomplished by preparing a homogeneous polyolefinic blend, comprising: (i) a base component consisting essentially of (a) 10 to 87 weight percent of polyolefin, (b) 10 to 70 weight percent of a polymer which is incompatible with the polyolefin and has a barrier property having low organic liquid and vapor permeability, and (c) 3 to 40 weight percent of an alkylcarboxyl-substituted polymer; and (ii) a reactive low molecular weight component consisting essentially of (d) 0.001 to 0.5 weight percent (based on the total weight of the base component) of a polar compound having functional groups reactive with the polymer which has a barrier property having low organic liquid and vapor permeability and (e) 0.0001 to 0.01 weight percent (based on the total weight of the base component) of an initiator which will cause a reaction between the polyolefin and the polar compound. The polymer, which has a barrier property having low organic liquid and vapor permeability, is present in the form of a homogeneous distribution of thin, wide disk-like layers in the polyolefin phase.

Another aspect of the present invention provides a process for preparing a homogeneous polyolefinic blend, comprising the steps of: (i) establishing a base component consisting essentially of (a) 10 to 87 weight percent of polyolefin, (b) 10 to 70 weight percent of a polymer which is incompatible with the polyolefin and has a barrier property having low organic liquid and vapor permeability, and (c) 3 to 40 weight percent of an alkylcarboxyl-substituted polymer, and a reactive low molecular weight component consisting essentially of (d) 0.001 to 0.5 weight percent (based on the total weight of the base component) of a polar compound with functional groups reactive with the polymer which has a barrier property having low organic liquid and vapor permeability, and (e) 0.0001 to 0.01 weight percent (based on the total weight of the base component) of an initiator which will cause a reaction between the polyolefin and the polar compound. (ii) melt-coating the reactive low molecular weight component on (b) the polymer which has a barrier property having low organic liquid and vapor permeability; and (iii) blending the melt-coated polymer with (a) the polyolefin and (c) the alkylcarboxyl-substituted polymer.

BRIEF DESCRIPTION OF THE DRAWINGS

The above objects and other features and advantages of the present invention will be more apparent from the following detailed descriptions taken with reference to the accompanying drawings, in which.

DETAILED DESCRIPTION OF THE INVENTION

Figure 1A:
FIG. 1A schematically shows a morphology of a prior art polyolefinic blend.
Figure 1B:
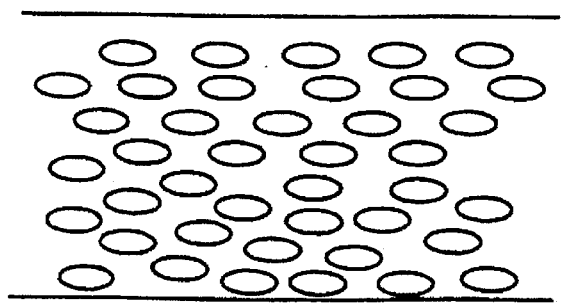
FIG. 1B schematically shows a morphology of another prior art polyolefinic blend.
Figure 1C:
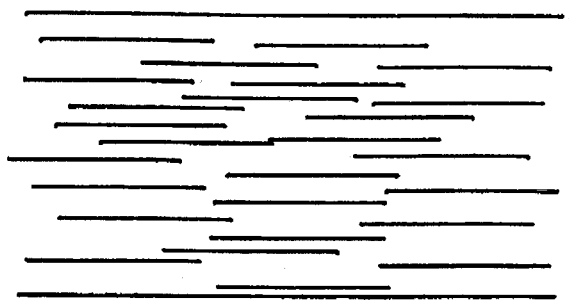
FIG. 1C schematically shows a morphology of a polyolefinic blend according to the present invention.
Figure 2:
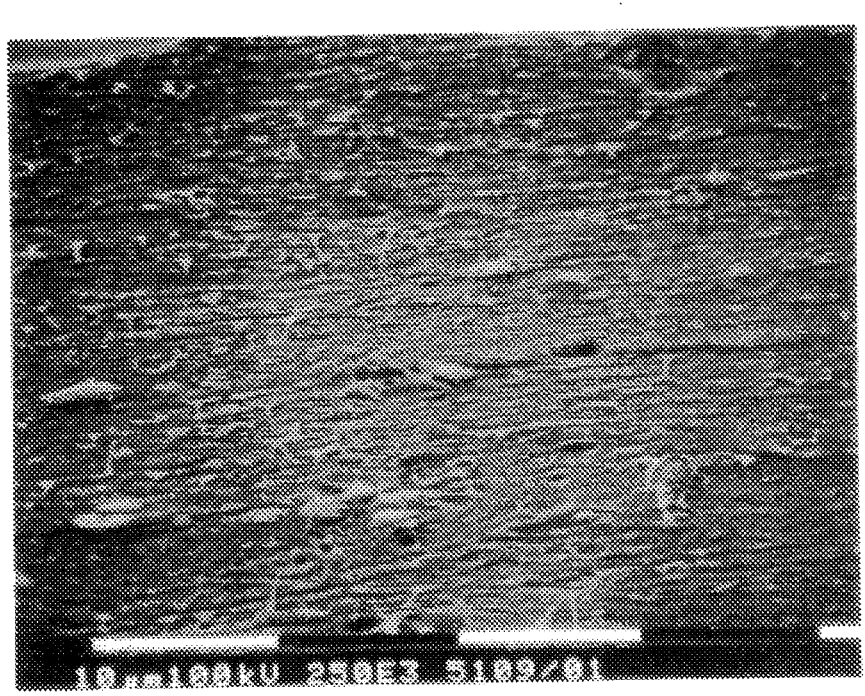
FIG. 2 is an electron microscopic photograph magnified by two thousand and five hundred times, showing the disc-like structure of a cross-section of a blown film prepared in Example 1 of the present invention.
Figure 3:
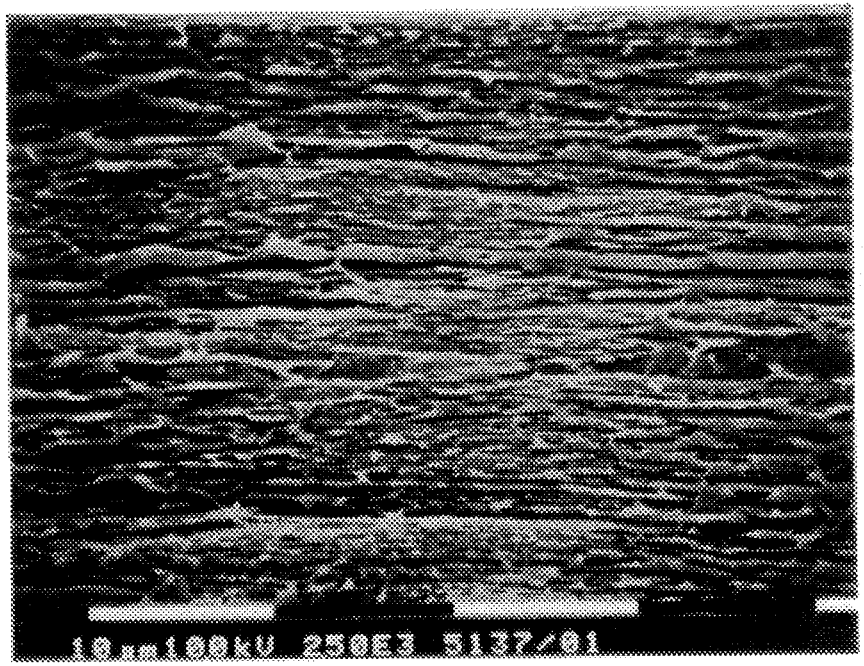
FIG. 3 is an electron microscopic photograph magnified by two thousand and five hundred times, showing the disc-like structure of a cross-section of a blown film prepared in Example 3 of the present invention.
Figure 4:
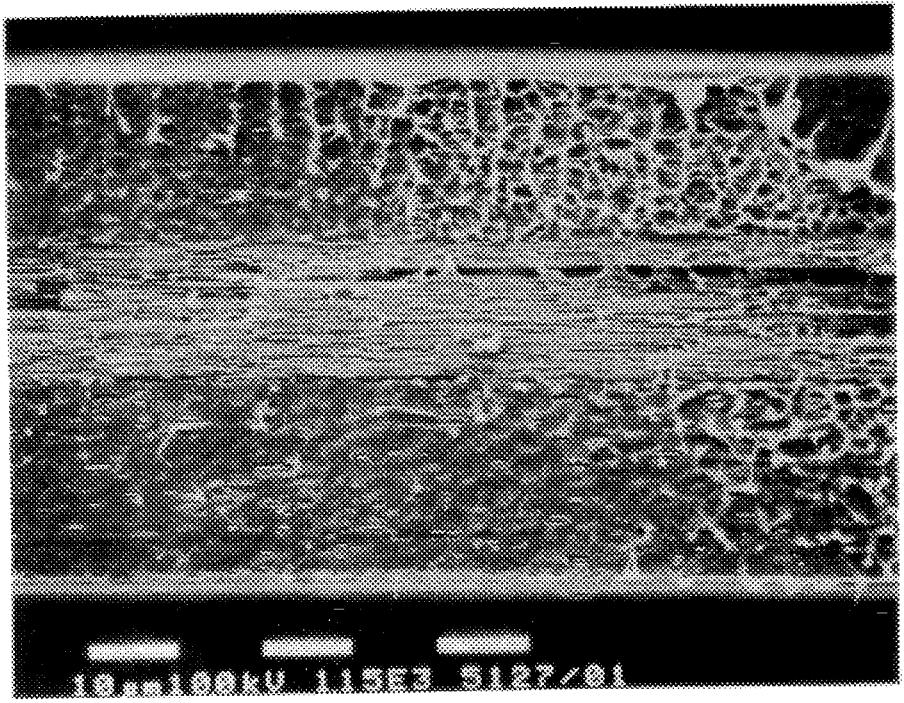
FIG. 4 is an electron microscopic photograph magnified by a thousand and one hundred fifty times, showing the disc-like structure of a cross-section of a 3-layer blown film prepared in Example 6 of the present invention.
Figure 5:
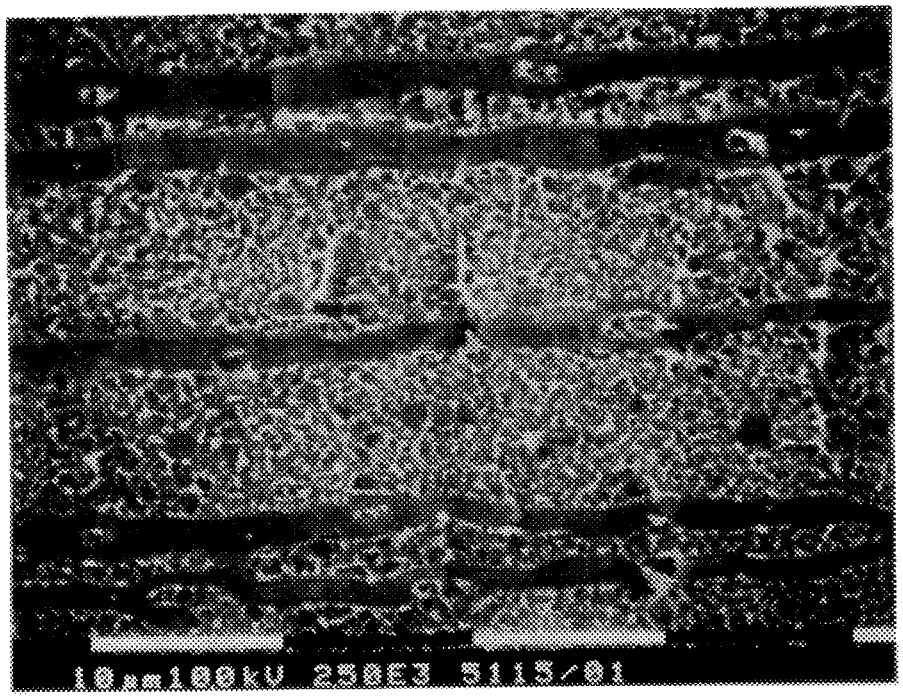
FIG. 5 is an electron microscopic photograph magnified by two thousand and five hundred times, showing a laminar platelet structure of a cross-section of a bottle prepared with a heterogeneous blend as a control for that of FIG. 2.
Figure 6:
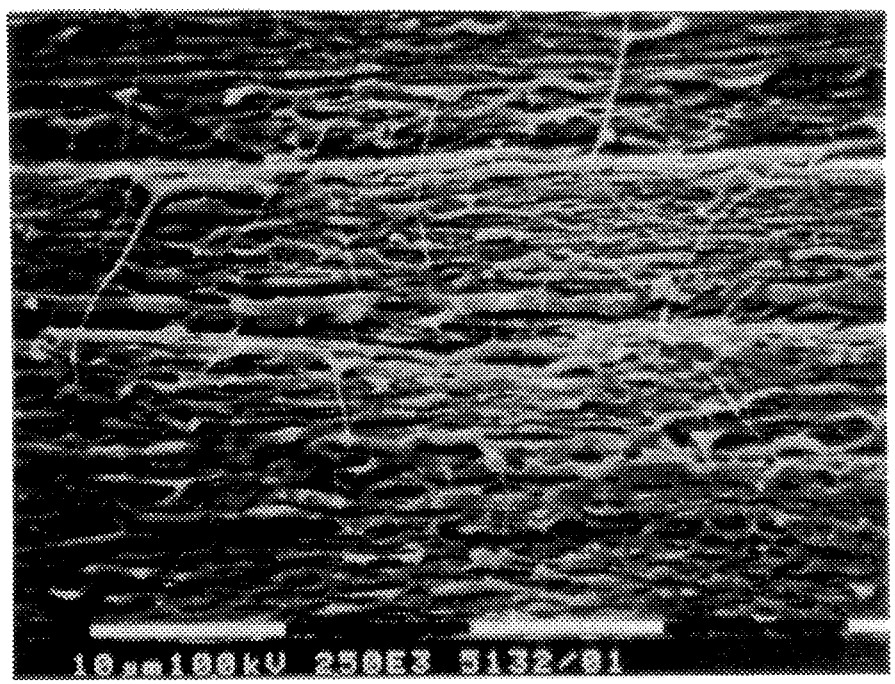
FIG. 6 is an electron microscopic photograph magnified by two thousand and five hundred times, showing a laminar platelet structure of a cross-section of a blown film prepared in Comparative Example 2 as a control for those of FIGS. 1 and 3.

The present invention pertains to an improvement in the barrier property to organic liquid and vapor permeability of a blend comprising polyolefin, a polymer with a barrier property having low organic liquid and vapor permeability, an alkylcarboxyl-substituted polyolefin and reactive low molecular weight compounds. The polymer with a barrier property having low organic liquid and vapor permeability is distributed as a multitude of thin, wide, disc-like layers in the polyolefin phase. The compatibilizing substances minimize the interfacial energy between the two polymers to adhere them together. The blend displays a morphology shown in FIG. 1C, which is thinner and wider than that of FIG. 1A.

The polymeric compatibilizer alone cannot decrease the interfacial energy between the two polymers to a degree that the polymer with a barrier property to organic liquid and vapor permeability may be present as a multitude of thin, wide, disc-like layers in the polyolefin phase. A melt blend comprising the polymeric compatibilizer as the only compatibilizing substance is superior in processability and the resulting has good mechanical properties. However, the article barrier property of the article to organic liquid and vapor permeability is significantly decreased.

Accordingly, an aspect of the present invention provides a polyolefinic blend comprising a base component consisting essentially of polyolefin, a polymer which has a barrier property having low organic solvent and vapor permeability and a compatibilizer of an alkylcarboxyl-substituted polyolefin, and reactive low molecular weight compounds consisting essentially of a polar compound and an initiator which will cause a reaction between the polyolefin and the polar compound.

Coexistence of the reactive low molecular weight compounds and the polymeric compatibilizer in a blend of polyolefin and a polymer with a barrier property having low organic liquid and vapor permeability can bring about superior processability into the melt blend. Also, the resulting articles can have excellent mechanical properties and a barrier property to organic liquid and vapor permeability. In this blend, the reactive low molecular weight compounds are distributed abundantly at the interface of the two polymers which causes a reaction that forms a copolymer of the two polymers to reduce the interfacial energy.

In the present polyolefinic blend, based on the total weight of the base components, the polar compound and the initiator are contained in an amount of 0.001 to 0.5% by weight and 0.0001 to 0.01% by weight, respectively. Of the initiator added, a substantial amount is reacted with the polar compound, which subsequently limits the amount of cross-linking which occurs. Accordingly, a blend which has improved barrier property to organic liquid and vapor permeability, and has superior processability and mechanical properties can be prepared in accordance with the present invention. In order to distribute the reactive low molecular weight compounds abundantly at the interface between the two polymers, they are melt-coated on the surface of a pellet of the polymer which has a barrier property having low organic liquid and vapor permeability.

The term "organic liquid" as used herein means aromatic hydrocarbons such as benzene, toluene, xylene and ketones, alcohols, ethers, esters, etc. The term "vapor" denotes the gaseous state of the "organic liquid", oxygen, nitrogen, etc.

As will be explained in detail below, the polymeric compatibilizer used in the present invention may be a polyolefin comprising a polar compound attached to its backbone or a side chain.

As previously mentioned, the reactive low molecular weight compounds consist essentially of two groups: one is a polar compound having a functional group reactive with the polymer which has a barrier property having low organic liquid and vapor permeability; the other is an initiator which causes a chemical reaction between the polyolefin and the polar compound.

Depending on the chemical structure of the polymer with the barrier property having low organic liquid and vapor permeability, the polar compound may be suitably selected from a group consisting of carboxylic acids, anhydrides, ester monomers and dicarboxylic monoester. Examples of the polar compounds include acrylic acid, ethacrylic acid, methacrylic acid, maleic acid, fumaric acid, itaconic acid, glycidyl methacrylate, 2-hydroxy ethacrylate, 2-hydroxyethyl methacrylate, monoethyl maleate, diethyl maleate, di-n-butyl maleate, maleic anhydride, dodecyl succinic anhydride, 5-norbonene-2,3-anhydride, nadic anhydride, and so on.

Preferred examples of the initiator used in the present invention include acyl peroxides, such as benzoyl peroxide, dialkyl or aralkyl peroxides, such as di-t-butyl peroxide, dicumyl peroxide, cumyl butyl peroxide, 1,1-di-t-butyl peroxy-3,5,5-trimethylcyclohexane, 2,5-dimethyl-2,5-di-t-butylperoxyhexane and α-t-butyl peroxyisopropylbenzene, peroxy esters, such as t-butyl peroxypivalate, t-butyl di(perphthalate)dialkyl peroxymonocarbonate and peroxydicarbonate, hydroperoxides, such as t-butyl hydroperoxide, p-methane hydroperoxide, pinane hydroperoxide and cumene hydroperoxide, ketone peroxides, such as cyclohexanone peroxide and methylethyl ketone peroxide, and azo compounds, such as azobisisobutyronitrile.

In accordance with the present invention, the polyolefinic blend may be added with a salt-forming agent aimed at improving the adhesion between the two polymers. Usable salt-forming agents are those that are capable of forming salts through reaction with the acid moiety of the polar compound. They are exemplified by magnesium oxide, titanium oxide and zinc oxide.

In taking advantage of the technology of the present invention, ordinary processing equipment, such as blown film extrusion or cast extrusion, can be used to prepare articles, such as film and sheet, which are superior in both mechanical properties and the barrier property to organic liquid and vapor permeability.

The respective components for practicing the present invention are present in the following proportions. The polyolefin is contained in an amount of 10 to 87% by weight and preferably in an amount of 40 to 70% by weight in the base component. The polymer which is superior in barrier property to organic liquid and vapor permeability amounts to from 10 to 70% by weight, and preferably to from 20 to 50% by weight of the base component. The polymeric compatibilizer amounts to from 3 to 40% by weight, and preferably to from 5 to 20% by weight of the base component.

The reactive low molecular weight compounds are present in the following porportions. The amount of the polar compound is on the order of 0.001 to 0.5% % by weight, based on the total weight of the base component, and preferably on the order of 0.01 to 0.3% by weight. The initiator is present in an amount of 0.0001 to 0.01% by weight, based on the total weight of the base component, and preferably in an amount of 0.001 to 0.008% by weight. In the case of inclusion of the salt-forming agent, its amount ranges from approximately 0.001 to approximately 0.1% by weight, based on the total weight of the base component, and preferably ranges from approximately 0.01 to approximately 0.05% by weight. If necessary, the polyolefinic blend of the present invention may comprise a trace amount of additives, such as pigments, stabilizers, lubricants and the like, which are generally used in structural polymeric materials. The amounts of such additives are not included in the calculation of amounts of the base component and the reactive low molecular weight components.

When the polymer with a barrier property having low organic liquid and vapor permeability is above 70% by weight in the base component, the polymer will be less than 100% of the discontinuous phase. Thus, the barrier property to organic liquid and vapor permeability in water deteriorates. On the other hand, when its amount is below 10% by weight, it becomes remarkably inferior in barrier property to organic liquid and vapor permeability.

If the initiator of the reactive low molecular weight components is over 0.01% by weight, there is a large amount of cross-linking in the polyolefin phase. This makes stretch extruding processing, such as blow molding or cast extrusion, difficult or the mechanical properties may decrease. On the other hand, if the initiator is present in an amount below 0.0001% by weight, there is insufficient initiation reaction between the polar compound and the polyolefin.

As previously mentioned, the amount of the polar compound required to be added corresponds to the amount of initiator used. For example, if over 0.5% by weight of the polar compound is used, unreacted compounds are abundant, resulting in discoloration of the final article, such as film. On the other hand, if it is added in an amount below 0.0001% by weight, sufficient adhesion between the two polymers does not occur.

The processability and the mechanical properties of a final article, such as film, may deteriorate by the addition of below 3% by weight of the polymeric compatibilizer to the polyolefinic blend because of a decrease in the interfacial adhesiveness. A melt blend comprising over 40% by weight of the polymeric compatibilizer is difficult to subject to stretch processing, such as blow molding or cast extrusion, because the melt strength is lowered.

The polyolefins used in the blend of the present invention serve as matrices and include polyethylene, polypropylene, polybutylene, copolymers thereof and the like. The polyethylene may be high (HDPE), medium (MDPE) or low (LDPE) density. Polyethylene which is linear and low density (LLDPE) is especially useful.

The polymers which are incompatible with the polyolefin and have a barrier property having low organic liquid and vapor permeability, include polyamides, polyesters, ethylene vinylalcohol copolymers comprising ethylene in an amount of 20 to 60% by weight, and polyacrylonitrile. Exemplary polyamides include nylon 6, nylon 66, nylon 6/66 copolymer, nylon 610, nylon 12 and the like. Polyesters are exemplified by polyethylene terephthalate and polybutylene terephthalate.

In the present invention, a sheet- or film-like article can be made from the above-mentioned homogeneous polyolefinic blend. A multilayer sheet- or film-like article comprising at least one layer of sheet- or film-like article as above can also be made.

The preferred embodiment of the present invention will now be further described with reference to the following specific examples.

COMPARATIVE EXAMPLE 1

A mixture consisting of ethylene vinylalcohol copolymer (EVOH), polyolefin and ethylene acrylic acid (EAA) with a weight ratio of 40:50:10 was added with 0.1 weight percent (based on the total weight of the mixture) of dicumyl peroxide as a coupling agent, and then dry-blended in a tumble mixer. The resulting mixture was manufactured into a film with a width of 500 mm and a thickness of 40 µm, using a blown film machine commercially available from Shinwha Industry Inc. Korea, identified as model SE-50/EHV-800, and equipped with a screw having a compression ratio of 4:1. The film was made at an extrusion temperature of about 180° C.

The ethylene vinylalcohol copolymer was such as that sold by Kuraray K.K., Japan, under the trademark "Eval E105", with an ethylene content of 44% by weight and a melting point of about 165° C.

The ethylene acrylic acid was such as that sold by Dow Chemical, U.S.A., under the trademark "Primacor 1410", with a melt index of 1.5 and an acrylic acid content of 9.0% by weight.

The polyolefin was a linear low density polyethylene (hereinafter referred to as "LLDPE") having a density of 0.919 and a melt index of 0.75 as determined according to ASTM D1238 procedure A. It was commercially available from YuKong Co. Ltd, Korea, under the trademark "Yuclair FL 120".

In this and the following Examples, the amount of materials added in the mixture of ethylene vinylalcohol copolymer, LLDPE and ethylene acrylic acid was on a weight percent basis based on the total weight of the mixture, thereof.

A visual test was conducted by using an electron microscope identified as model Phillips 515, and there was clear evidence of a disc-like structure in the cross section of the film.

Barrier to gas permeation was tested by use of a gas transmission rater identified as model Toyoseiki M-C1, B type.

The film was subjected to elongation at break and tensile strength at break using UTM identified as model Instron 4301.

Results of the individual tests are shown in Table 1.

COMPARATIVE EXAMPLE 2

A film was prepared in the same manner as in Comparative Example 1, except that a mixture consisting of ethylene vinylalcohol copolymer, LLDPE and ethylene acrylic acid with a weight ratio of 40:50:10 was added with 0.02 weight percent (based on the total weight of the mixture) of dicumyl peroxide as a coupling agent. The same tests as in Comparative Example 1 were conducted to measure the physical properties of the film.

Results of the individual tests are shown in Table 1.

COMPARATIVE EXAMPLE 3

Comparative Example 1 was repeated using 40 weight percent of an ethylene vinyl alcohol copolymer which exhibited superior barrier property to organic liquid and vapor permeability, and 60 weight percent of LLDPE, which was incompatible with the ethylene vinylalcohol copolymer. The same tests as in Comparative Example 1 were conducted to measure the physical properties of the resulting film.

Results of the individual tests are shown in Table 1.

EXAMPLE 1

Comparative Example 1 was repeated using a mixture consisting of 40 weight percent of ethylene vinylalcohol copolymer, 50 weight percent of LLDPE and 10 weight percent of ethylene acrylic acid, after the ethylene vinylalcohol copolymer was coated in a super mixer with 0.004 weight percent of dicumyl peroxide and 0.04 weight percent of acrylic acid (AA) (based on the total weight of the mixture). A film was made in the same way as in Comparative Example 1 and was subjected to the various tests to measure the physical properties thereof.

Results of the individual tests are shown in Table 1.

TABLE 1

| Exam. No. | Content | | | | | *1Oxygen Permeability | Elongation at Break (%) | Tensile Strength at Break (kg/cm²) | *2Processability |
|---|---|---|---|---|---|---|---|---|---|
| | EVOH | EAA | LLDPE | Peroxide | AA | | | | |
| C-1 | 40 | 10 | 50 | 0.1 | — | n.a*3 | n.a. | n.a. | XX |
| C-2 | 40 | 10 | 50 | 0.02 | — | 35.6 | 62 | 92.4 | X |
| C-3 | 40 | — | 60 | — | — | 650 | 327 | 232 | Δ |
| C-4 | 40 | 10 | 50 | — | — | 460 | 367 | 427 | o |
| 1 | 40 | 10 | 50 | 0.004 | 0.04 | 4.3 | 347 | 455 | o |

*1unit: CC.MM/M² 24 hr., atm
*2XX: very poor, X: poor, Δ: common, o: good
*3n.a.: not available

COMPARATIVE EXAMPLE 4

A film was prepared in the same manner as in Comparative Example 1, except that a mixture consisting of ethylene vinylalcohol copolymer, LLDPE and ethylene acrylic acid with a weight ratio of 40:50:10 was used without adding a coupling agent. The same tests as in Comparative Example 1 were conducted to measure the physical properties of the film.

Results of the individual tests are shown in Table 1.

EXAMPLES 2 THROUGH 4

Films were prepared in the same manner as in Example 1, except that peroxide and acrylic acid were used in the amounts given in Table 2. The same tests as in Comparative Example 1 were conducted to measure the physical properties of the films.

Results of the individual tests are shown in Table 2.

TABLE 2

| Exam. No. | Content | | | | | *¹Oxygen Permeability | Elongation at Break (%) | Tensile Strength at Break (kg/cm²) |
|---|---|---|---|---|---|---|---|---|
| | EVOH | EAA | LLDPE | Peroxide | AA | | | |
| 1 | 40 | 10 | 50 | 0.004 | 0.04 | 4.3 | 347 | 465 |
| 2 | 40 | 10 | 50 | 0.01 | 0.04 | 3.9 | 259 | 280 |
| 3 | 40 | 10 | 50 | 0.01 | 0.1 | 5.2 | 257 | 284 |
| 4 | 40 | 10 | 50 | 0.01 | 0.2 | 5.8 | 279 | 303 |

*¹unit: CC.MM/M² 24 hr., atm

COMPARATIVE EXAMPLE 5

A film was prepared in the same manner as in Comparative Example 1, except that a mixture consisting of ethylene vinylalcohol copolymer, LLDPE and ethylene acrylic acid with a weight ratio of 30:60:10 was used without adding a coupling agent. The same tests as in Comparative Example 1 were conducted to measure the physical properties of the film.

Results of the individual tests are shown in Table 3.

EXAMPLE 5

Example 1 was repeated using a mixture consisting of 30 weight percent of ethylene vinylalcohol copolymer, 60 weight percent of LLDPE and 10 weight percent of ethylene acrylic acid, after the ethylene vinylalcohol copolymer was coated in a super mixer with 0.002 weight percent of dicumyl peroxide and 0.02 weight percent of acrylic acid (based on the total weight of the mixture). A film was made in the same way as in Comparative Example 1 and was subjected to the various tests to measure the physical properties thereof.

Results of the individual tests are shown in Table 3.

into the middle layer extruder of a three-layer blown film machine such as that sold by Kiefel GmbH., Germany, identified as model Rotex 40s/30s/40sa, with LLDPE was fed into the inside and outside extruders thereof, to manufacture a 3-layer blown film which was about 500 mm wide and about 40 μm thick. For this operation, the middle layer extruder was equipped with a screw having a compression ratio of 3:8:1 and was maintained at an extrusion temperature of about 175° C.

The same tests as in Comparative Example 1 were conducted to measure the physical properties of the film.

Results of the individual tests are shown in Table 4.

EXAMPLE 6

Comparative Example 6 was repeated using a mixture consisting of 30 weight percent of ethylene vinylalcohol copolymer, 60 weight percent of LLDPE and 10 weight percent of ethylene acrylic acid, after the ethylene vinylalcohol copolymer was coated in a super mixer with 0.002 weight percent of dicumyl peroxide and 0.02 weight percent of acrylic acid (based on the total weight of the mixture). A 3-layer blown film was made in the same way as in Comparative Example 6 and was subjected to the various tests in

TABLE 3

| Exam. No. | Content | | | | | *¹Oxygen Permeability | Elongation at Break (%) | Tensile Strength at Break (kg/cm²) |
|---|---|---|---|---|---|---|---|---|
| | EVOH | EAA | LLDPE | Peroxide | AA | | | |
| C-5 | 30 | 10 | 60 | — | — | 570 | 460 | 376 |
| 5 | 30 | 10 | 60 | 0.002 | 0.02 | 10.76 | 381 | 392 |

*¹unit: CC.MM/M² 24 hr., atm

COMPARATIVE EXAMPLE 6

A mixture consisting of ethylene vinylalcohol copolymer, LLDPE and ethylene acrylic acid with a weight ratio of 30:60:10 was dry-blended in a tumble mixer. It was then fed the same way as in Comparative Example 1 to measure the physical properties thereof.

Results of the individual tests are shown in Table 4.

TABLE 4

| Exam. No. | Content | | | | | *¹Oxygen Permeability | Elongation at Break (%) | Tensile Strength at Break (kg/cm²) |
|---|---|---|---|---|---|---|---|---|
| | EVOH | EAA | LLDPE | Peroxide | AA | | | |
| C-6 | 30 | 10 | 60 | — | — | 532 | 507 | 329 |
| 6 | 30 | 10 | 60 | 0.002 | 0.02 | 10.3 | 453 | 358 |

*¹unit: CC.MM/M² 24 hr., atm

COMPARATIVE EXAMPLE 7

A film was prepared in the same manner as in Comparative Example 1, except that a mixture consisting of ethylene vinylalcohol copolymer, LLDPE and ethylene acrylic acid with a weight ratio of 10:87:3 was used without adding a coupling agent. The same tests as in Comparative Example 1 were conducted to measure the physical properties of the film.

Results of the individual tests are shown in Table 5.

EXAMPLE 7

Example 1 was repeated using a mixture consisting of 10 weight percent of ethylene vinylalcohol copolymer, 87 weight percent of LLDPE and 3 weight percent of ethylene acrylic acid, after the ethylene vinyl alcohol was coated in a super mixer with 0.002 weight percent of dicumyl peroxide and 0.02 weight percent of acrylic acid (based on the total weight of the mixture). A film was made in the same way as in Comparative Example 1 and was subjected to the various tests to measure the physical properties thereof.

Results of the individual tests shown in Table 5.

TABLE 5

| Exam. No. | Content | | | | | *[1]Oxygen Permeability | Elongation at Break (%) | Tensile Strength at Break (kg/cm$^2$) |
| --- | --- | --- | --- | --- | --- | --- | --- | --- |
| | EVOH | EAA | LLDPE | Peroxide | AA | | | |
| C-7 | 10 | 3 | 87 | — | — | 1000> | 613 | 269 |
| 7 | 10 | 3 | 87 | 0.002 | 0.02 | 387 | 554 | 250 |

*[1]unit: CC.MM/M$^2$ 24 hr., atm

EXAMPLE 8

Example 1 was repeated using a mixture consisting of 30 weight percent of ethylene vinylalcohol copolymer, 60 weight percent of LLDPE and 10 weight percent of ethylene acrylic acid, after the ethylene vinylalcohol copolymer was coated in a super mixer with 0.001 weight percent of dicumyl peroxide and 0.03 weight percent of maleic anhydride (MA) (based on the total weight of the mixture). A film was made in the same way as in Comparative Example 1 and was subjected to the various tests to measure the physical properties thereof.

Results of the individual tests are shown in Table 6.

TABLE 6

| Exam. No. | Content | | | | | *[1]Oxygen Permeability | Elongation at Break (%) | Tensile Strength at Break (kg/cm$^2$) |
| --- | --- | --- | --- | --- | --- | --- | --- | --- |
| | EVOH | EAA | LLDPE | Peroxide | AA | | | |
| 8 | 30 | 10 | 60 | 0.001 | 0.03 | 11.54 | 412 | 425 |

*[1]unit: CC.MM/M$^2$ 24 hr., atm

COMPARATIVE EXAMPLE 8

A mixture consisting of a polyamide with a superior barrier property to organic liquid and vapor permeability, maleic anhydride-substituted polyolefin and LLDPE with a weight ratio of 30:10:60 was dry-blended in a tumble mixer. It was then fed into a blown film machine such as that sold by Shinwha Industry, Korea, identified as model SE-50/EHV-800, to prepare a film which was about 500 mm wide and about 60 μm thick.

For this operation, the blown film machine was equipped with a screw having a compression ratio of 4:1 and was maintained at an extrusion temperature of about 220° C.

The polyamide was nylon 6 having a melting temperature of about 220° C. and a relative viscosity of 3.2, and was commercially available from Tong Yang Nylon Co. Ltd., Korea, under the trademark "1031B".

The maleic anhydride-substituted polyolefin was made by grafting maleic acid to polyethylene having a density of 0.948 and a melt index of 20 such that the polyolefin contained 0.98 weight percent maleic anhydride functionality.

The same tests as in Comparative Example 1 were conducted to measure the physical properties of the film.

Results of the individual tests are shown in Table 7.

EXAMPLE 9

A film was prepared in the same manner as in Comparative Example 8, except that 0.001 weight percent of dicumyl peroxide and 0.02 weight percent of maleic anhydride were also added in the extruder.

The same tests as in Comparative Example 1 were conducted to measure the physical properties of the film.

Results of the individual tests are shown in Table 7.

TABLE 7

| Exam. No. | Content | | | | | *¹Oxygen Permeability | Elongation at Break (%) | Tensile Strength at Break (kg/cm²) |
|---|---|---|---|---|---|---|---|---|
| | EVOH | C*² | LLDPE | Peroxide | MA | | | |
| C-8 | 30 | 10 | 60 | — | — | 1000> | 401 | 405 |
| 9 | 30 | 10 | 60 | 0.001 | 0.02 | 162 | 363 | 395 |

*¹unit: CC.MM/M² 24 hr., atm
*²C: maleic anhydride-substituted polyolefin

Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A process for preparing a polyolefinic blend for film, comprising the steps of:

(a) melt-coating a reactive low molecular weight component on to a polymer, wherein the polymer is incompatible with the polyolefin forming said blend and has a barrier property which provides low organic liquid permeability and low vapor permeability, wherein said polymer is selected from the group consisting of polyamide, polyester, polyacrylonitrile, ethylene vinyl alcohol copolymer comprising ethylene in an amount of 20 to 60% by weight, and combinations thereof, and the reactive low molecular weight component consists essentially of a polar compound having functional groups reactive with the polymer possessing said barrier property and an initiator capable of initiating the reaction of the polyolefin with the polar compound, (b) blending the melt-coated polymer with a polyolefin and an alkylcarboxyl-substituted polyolefin compatibilizer to form a polyolefinic blend, wherein the polyolefinic blend comprises
   (i) a base component consisting essentially of
      (a) 10 to 87 weight percent of a polyolefin,
      (b) 10 to 70 weight percent of the polymer possessing said barrier property, and
      (c) 3 to 40 weight percent of said alkylcarboxyl-substituted polyolefin compatibilizer; and
   (ii) the reactive low molecular weight component consisting essentially of
      (d) 0.001 to 0.5 weight percent of the polar compound having functional groups reactive with the polymer possessing said barrier property, based upon the total weight of the base component, and
      (e) 0.0001 to 0.01 weight percent of the initiator capable of initiating the reaction of the polyolefin with the polar compound, based on the total weight of the base component.

2. The process in accordance with claim 1, wherein said polyolefin is selected from the group consisting of polyethylene, polypropylene, polybutylene, copolymers thereof, and mixtures of any of them.

3. The process in accordance with claim 1, wherein said polar compound of said reactive low molecular weight component is at least one compound selected from the group consisting of carboxylic acid, anhydride, ester monomers and dicarboxylic monoester.

4. The process in accordance with claim 1, wherein said initiator of said reactive low molecular weight component is at least one compound selected from the group consisting of acyl peroxide, dialkyl or aralkyl peroxide, peroxy ester, hydroperoxide, ketone peroxide, and azo compound.

5. The process in accordance with claim 1, wherein said alkylcarboxyl-substituted polyolefin compatibilizer is a polyolefin comprising a polar compound selected from the group consisting of carboxylic acid, anhydride, ester monomers and dicarboxylic monoester, attached to the backbone or a side chain of said polyolefin.

* * * * *